United States Patent
Platner et al.

(10) Patent No.: US 6,991,223 B2
(45) Date of Patent: *Jan. 31, 2006

(54) COMPOSITE LEAF SPRING HAVING AN ARCUATE ATTACHMENT ARRANGEMENT FOR VEHICLE MOUNTING

(75) Inventors: David K. Platner, Shelby, MI (US); Ramin Rezakhanlou, Murcia (ES); James Trotter, Auburn Hills, MI (US)

(73) Assignee: ArvinMeritor Technology LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/656,872

(22) Filed: Sep. 5, 2003

(65) Prior Publication Data

US 2005/0051933 A1   Mar. 10, 2005

(51) Int. Cl.
*B60G 11/02* (2006.01)

(52) U.S. Cl. .................... 267/47; 267/36.1; 267/52; 267/260; 267/269; 280/124.17; 280/124.175

(58) Field of Classification Search ........... 267/36.1, 267/47, 48, 49, 50, 52, 260–271; 280/124.163, 280/124.17, 124.171, 124.174, 124.175
See application file for complete search history.

(56) References Cited

U.S. PATENT DOCUMENTS

| | | | | |
|---|---|---|---|---|
| 3,580,347 A | * | 5/1971 | McGee | 267/262 |
| 3,945,625 A | * | 3/1976 | Duchemin | 267/47 |
| 4,061,364 A | * | 12/1977 | Parks | 267/269 |
| 4,468,014 A | * | 8/1984 | Strong | 267/47 |
| 4,546,958 A | | 10/1985 | Ohno et al. | |
| 4,556,204 A | | 12/1985 | Pflederer | |
| 4,575,057 A | * | 3/1986 | Robertson | 267/47 |
| 4,732,371 A | | 3/1988 | Pflederer | |
| 4,773,631 A | * | 9/1988 | De Goncourt | 267/47 |
| 4,869,472 A | * | 9/1989 | de Goncourt | 267/52 |
| 4,886,254 A | * | 12/1989 | Carpentier et al. | 267/260 |
| 4,895,350 A | | 1/1990 | Schoof et al. | |
| 5,335,932 A | | 8/1994 | Pierce | |
| 5,542,652 A | * | 8/1996 | Stuart | 267/269 |
| 5,950,971 A | | 9/1999 | Koumbis et al. | |
| 6,206,407 B1 | | 3/2001 | Fuchs et al. | |
| 6,213,507 B1 | | 4/2001 | Ramsey et al. | |
| 6,234,502 B1 | | 5/2001 | Sobina | |
| 6,250,613 B1 | | 6/2001 | Koeske et al. | |
| 6,354,577 B1 | | 3/2002 | Quintile et al. | |
| 6,394,474 B1 | | 5/2002 | Warinner et al. | |
| 6,406,009 B1 | | 6/2002 | Constantinescu et al. | |
| 6,435,485 B1 | * | 8/2002 | Greco | 267/36.1 |
| 6,461,455 B1 | | 10/2002 | Meatto et al. | |
| 2005/0051934 A1 | * | 3/2005 | Platner et al. | 267/47 |

\* cited by examiner

*Primary Examiner*—Thomas Williams
(74) *Attorney, Agent, or Firm*—Carlson, Gaskey & Olds

(57) ABSTRACT

A suspension system includes a composite leaf spring having an arcuate segment that is located between a retaining pin and a bumper. The retaining pin includes a shank surrounded by a resilient tube. The bumper is located adjacent a rear wall of the bracket opposite the retaining pin. The bumper includes an arcuate face to engage the outer arc of the arcuate segment while the pin is at least partially surrounded by the arcuate segment. The end of the composite leaf spring is thereby securely yet resiliently retained within the front leaf spring attachment system without penetrating fasteners.

18 Claims, 7 Drawing Sheets

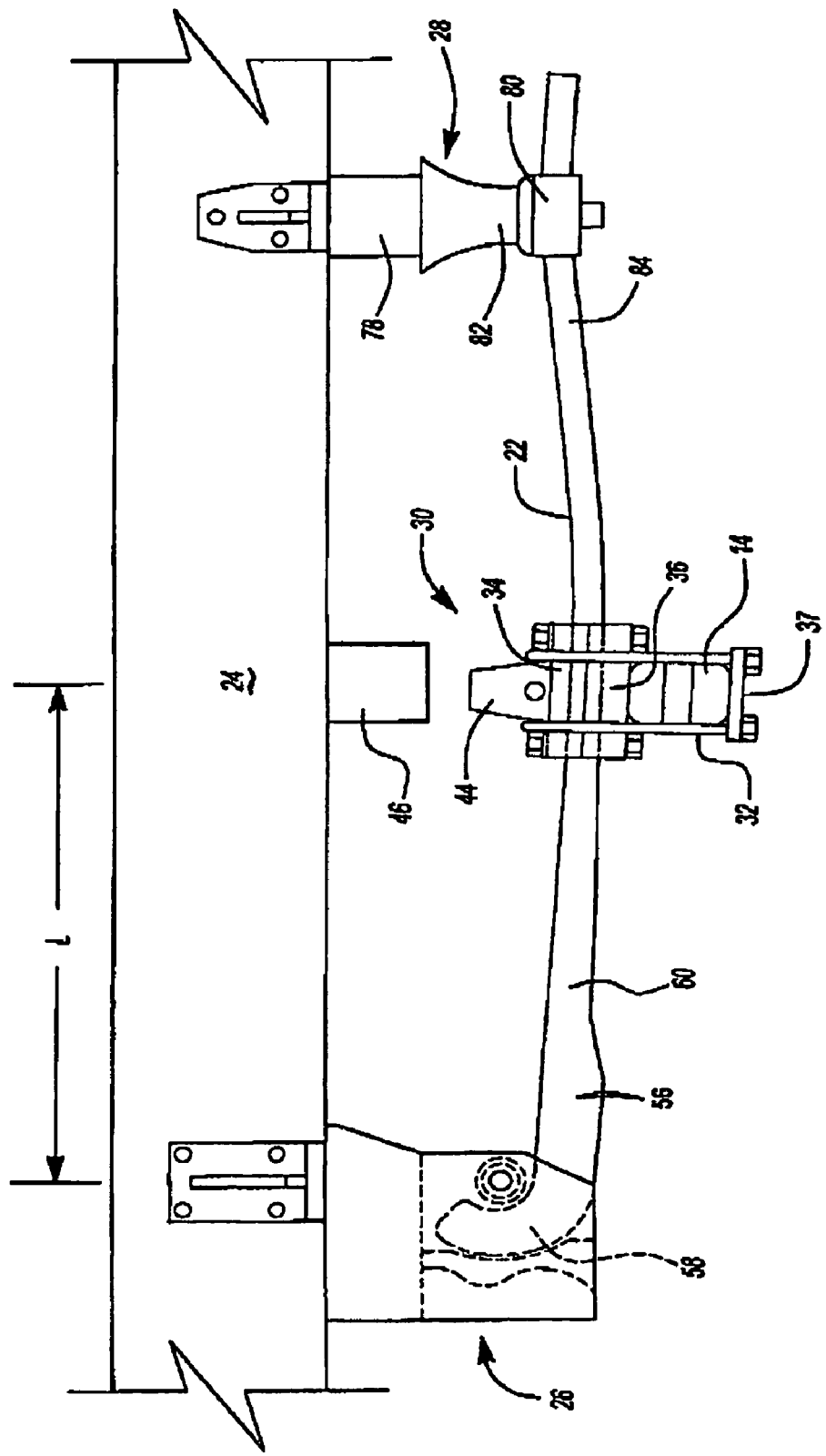

COMPOSITE LEAF SPRING HAVING AN ARCUATE ATTACHMENT ARRANGEMENT FOR VEHICLE MOUNTING

BACKGROUND OF THE INVENTION

The present invention relates to a leaf spring suspension and, more particularly, to a composite leaf spring defining an arcuate segment for mounting the leaf spring to a vehicle mainframe.

Various conventional vehicle suspensions include a leaf spring fabricated from a series of superimposed steel leaves. Steel leaf springs may be disadvantageous because they are relatively heavy, noisy, and subject to corrosion.

More recently, fiber reinforced resin composite materials have been utilized as a substitute for steel leaf springs. In some leaf springs of this type, a curved central section of the spring is molded from longitudinally extending fibrous material impregnated with a thermosetting resin. Separate metal end sections are attached through mechanical connectors to the ends of the curved central section. Another form of fiber reinforced resin composite leaf spring includes continuous strands of fibrous material impregnated with a thermosetting resin, which are wound around spaced bushings or pins in a loop configuration. After winding, the wound structure is placed in a mold with the parallel runs of the loop being brought together in flatwise contiguous relation while the resin is subsequently cured to provide an integral structure.

Each leaf spring is located adjacent a longitudinal vehicle frame rail underneath the body of a truck or trailer chassis. Although providing many benefits including lightweight and great strength, attachment of fiber reinforced resin composite leaf springs to the vehicle frame rails may pose various difficulties.

One difficulty includes the preference for avoiding mounting arrangements that require locating apertures through the composite leaf spring. Penetration of the composite leaf spring severs the fibrous materials and correspondingly reduces the physical characteristics of the spring. Conversely, elimination or minimization of apertures further decreases the mounting versatility for particular vehicle designs as specific metal end sections are utilized from frame rail mounting. That is, each leaf spring must be specifically tailored to a specific vehicle which may decrease the versatility of each leaf spring.

Other mounting arrangements include rather complicated brackets to avoid locating apertures through the leaf spring. Disadvantageously, the bracket arrangement may be relatively heavy in weight which may offset some of the weight advantage inherent to composite materials.

Furthermore, conventional mounting arrangements commonly provide a metal to composite interface. These dissimilar material interfaces are wear points which may weaken the composite material and reduce the life of the suspension.

Accordingly, it is desirable to provide an uncomplicated composite leaf spring attachment arrangement that accommodates various suspension members, does not require through apertures, avoids dissimilar material wear points, and is light in weight.

SUMMARY OF THE INVENTION

The suspension system according to the present invention includes a leaf spring attachment system for a composite leaf spring having an arcuate segment. The leaf spring attachment system includes a bracket mounted to the longitudinal mainframes, a retaining pin and a bumper which engage the arcuate segment.

The bracket is attached to the vehicle longitudinal mainframes and is generally C-shaped such that the opening thereof receives the arcuate leaf spring segment of the leaf spring. The retaining pin is located through the bracket across the opening thereof. The retaining pin includes a shank surrounded by a resilient tube.

The bumper is located adjacent a rear wall of the bracket opposite the retaining pin. The bumper includes an arcuate face to engage the outer arc of the arcuate segment while the pin is at least partially surrounded by the arcuate segment. The end of the composite leaf spring is thereby securely yet resiliently retained within the front leaf spring attachment system without penetrating fasteners.

Another leaf spring according to the present invention molds a tubular member molded directly to the leaf spring thereby simplifying the retaining pin to a single fastener, such as a bolt, which is passed through the tubular member to mount the leaf spring into the bracket.

The present invention therefore provides an uncomplicated composite leaf spring attachment arrangement which accommodates various suspension members, does not require through apertures, avoids dissimilar material wear points, and is light in weight.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4 is a side partial section view of a composite leaf spring suspension system according to the present invention;

DETAILED DESCRIPTION OF THE PREFERRED EMBODIMENT

Figure 1:
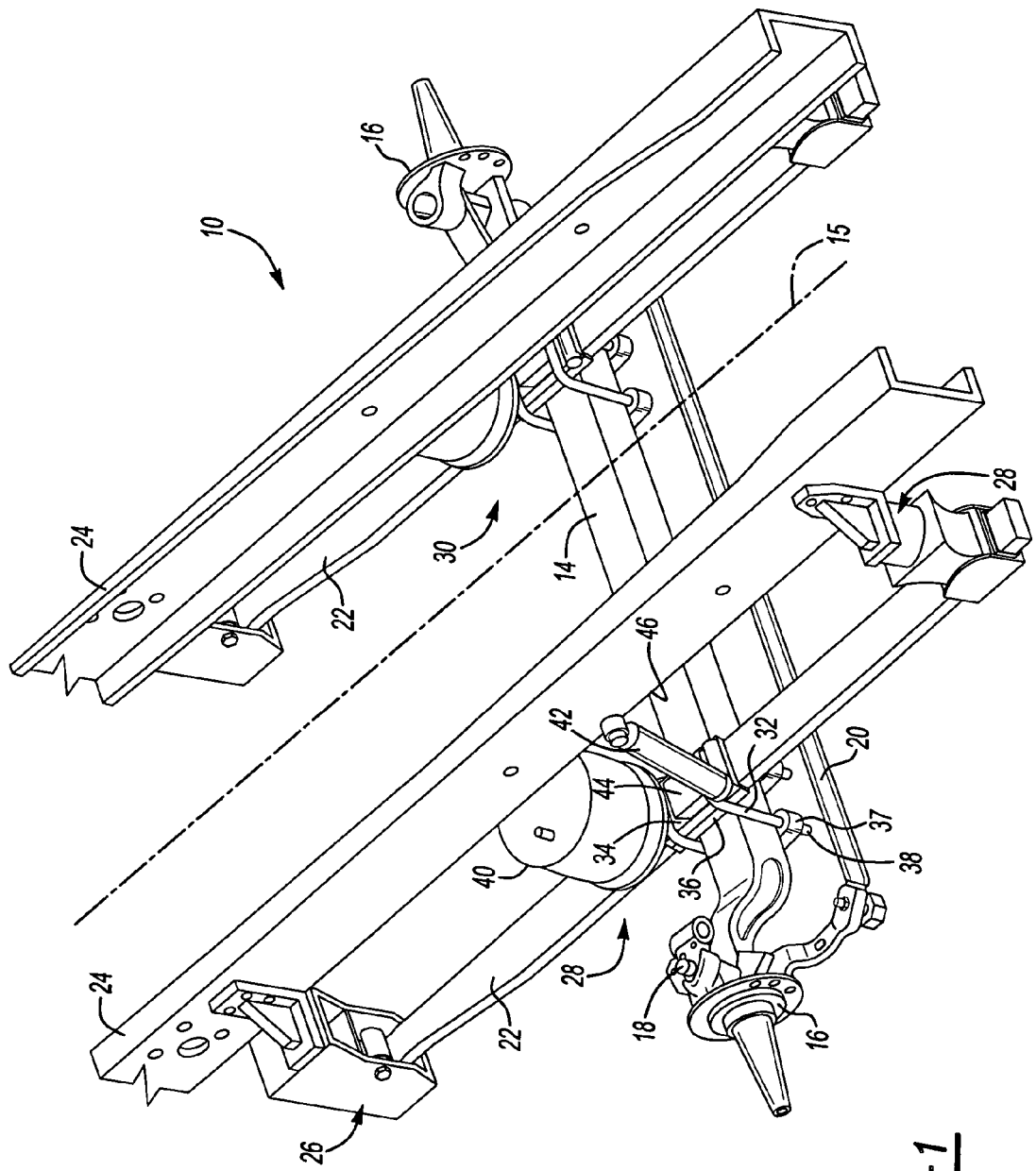
FIG. 1 is a general perspective view of a suspension system for use with the present invention.

FIG. 1 illustrates a general perspective view of a steerable air spring suspension system 10. Although a steerable air spring suspension is disclosed in the illustrated embodiment, it should be understood that other suspensions will benefit from the present invention. The present invention is particularly applicable to relatively heavy commercial vehicles.

The system 10 generally includes a primary structural support such as an axle beam 14. The axle beam 14 is preferably a single hollow square beam located transverse to a vehicle longitudinal axis 15. A pair of steerable hub assemblies 16 are pivotally supported by the axle beam 14. A king pin 18 or similar member pivotally attaches the steerable hub assembly 16 to the axle beam 14 in a known manner. The steerable hub assemblies 16 are articulatable through a steering gear assembly (not shown) and are linked together by a linkage 20.

To dampen movement of the axle beam 14, a flexible member such as a composite leaf spring 22 is attached to longitudinal mainframes 24 which extend parallel to the vehicle longitudinal axis 15. The composite leaf springs 22 are attached to the mainframes 24 through a front leaf spring attachment system 26 and a rear leaf spring attachment system 28. An axle beam attachment system 30 attaches the axle beam 14 to each composite leaf spring 22 intermediate the attachment systems 26, 28.

Each composite leaf spring 22 is preferably manufactured of a fiber reinforced resin composite material according to a manufacturing process such as that provided by Liteflex LLC of Englewood, Ohio. Generally, continuous strands of fibrous material impregnated with a thermosetting resin are wound around spaced bushings or pins in a loop configuration.

After winding, the wound structure is placed in a mold with the parallel runs of the loop being brought together in flatwise-contiguous relation. The resin is then subsequently cured to provide an integral oval structure which is separated and trimmed to provide two separate leaf springs. It should be understood that various manufacturing methods for the fiber reinforced resin composite material leaf spring will benefit from the present invention.

The axle beam attachment system 30 attaches the leaf spring 22 to the axle beam 14 through U-bolts 32 which sandwich the leaf spring between an upper clamp plate 34 and a lower clamp plate 36. The U-bolts 32 pass over the clamp plates 34, 36 around the axle beam 14 and are retained below the axle beam 14 with a fastener plate 37 and fasteners 38. The fastener plate 37 preferably straddles the open end of the U-bolts 32 to retain the axle beam 14. The axle beam attachment system 30 location in combination with the leaf spring shape defines the characteristics of the suspension system.

Other suspension components such as an air bag 40 and a shock 42 are mounted between each leaf spring 22 and longitudinal mainframe 24. It should be understood that other suspension component positions and mounts independent of the axle beam attachment system 30 will also benefit from the present invention.

A stop 44 mounted to the upper surface of the upper clamp plate 34 preferably contacts a main beam stop 46 to prevent over flexing of the leaf spring 22. That is, stops 44, 46 limit the compression of the leaf spring 22 to avoid the potential for over flexing and possible damage therefrom.

Referring to FIGS. 2A, 2B, 2C and 2D, the leaf spring 22 includes a mounting segment 48 which engages the axle beam attachment system 30 (FIG. 1) to provide an infinitely adjustable mounting location for infinite positioning of the axle beam 14 location setbacks to accommodate a multiple of vehicles. That is, the axle beam 14 may be located anywhere along the mounting segment 48 to provide a desired axle beam 14 setback.

Figure 2A:
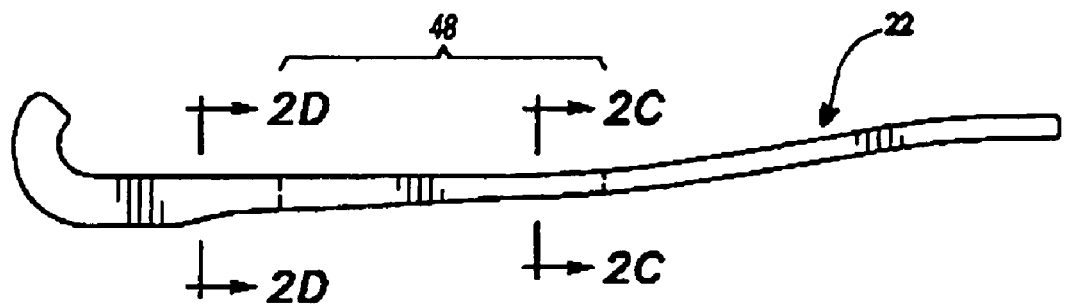
FIG. 2A is a general side perspective view of a composite leaf spring.
Figure 2B:
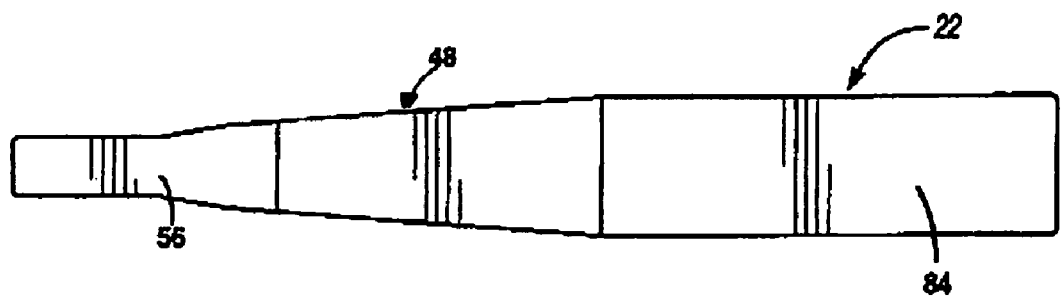
FIG. 2B is a general top perspective view of a composite leaf spring.
Figure 2C:
FIG. 2C is a sectional view of the composite leaf spring taken along line 2C—2C in FIG. 2A.
Figure 2D:
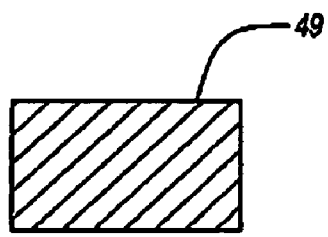
FIG. 2D is a sectional view of the composite leaf spring taken along line 2D—2D in FIG. 2A.

The mounting segment 48 provides a tapered width (FIG. 2B) combined with an expanding depth. That is, within the mounting segment 48, the width is consistently decreasing as the depth is consistently increasing. Any position along the longitudinal length of the mounting segment 48 thereby provides a unique cross-sectional shape (49; FIG. 2C) taken parallel to the axle beam 14. That is, any longitudinal position provides a unique combination of leaf spring width and leaf spring depth as illustrated by the different cross-sectional shapes illustrated in FIGS. 2C and 2D. Preferably, a cross-section parallel to the axle beam 14 taken anywhere along the mounting segment 48 will provide a constant area of the cross-sectional shape 49.

Figure 3:
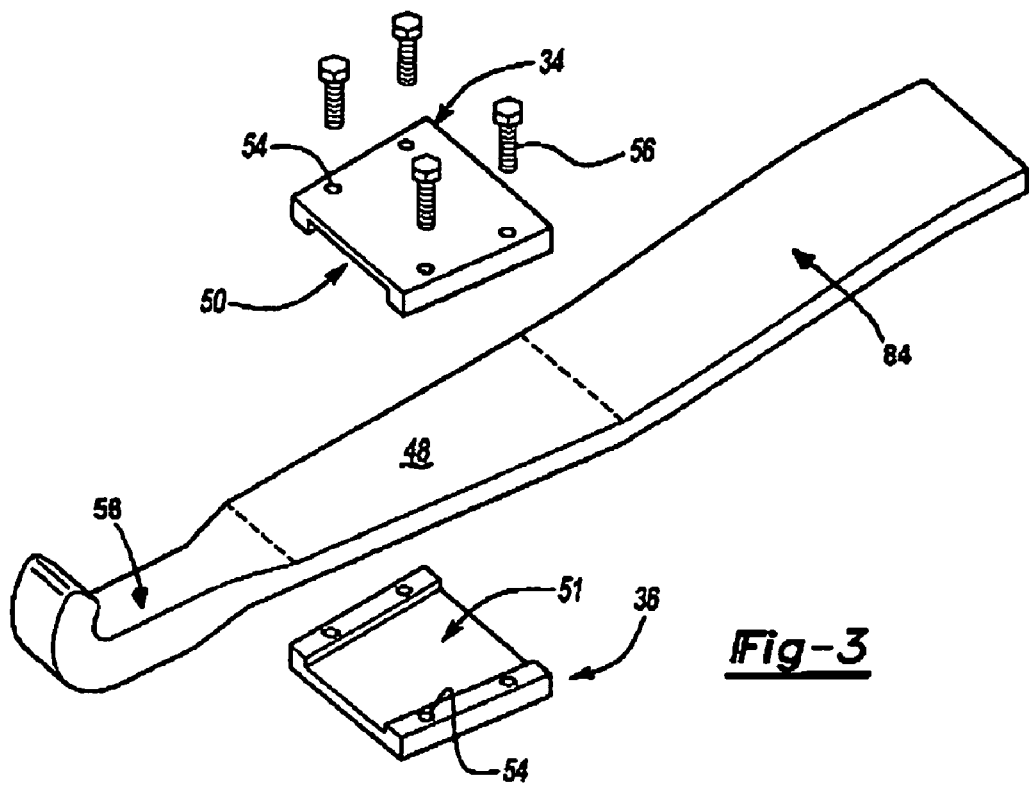
FIG. 3 is an exploded view of an axle beam attachment system for use with a composite leaf spring.

Referring to FIG. 3, an interior cavity 50 of the upper clamp plate 34 and an interior cavity 51 of the lower clamp plate 36 defines the position of the axle beam attachment system 30 along the mounting segment 48. The interior cavities 50, 51 are each a generally U-shaped to correspond with the desired position along the mounting segment 48. The base of each interior cavities 50, 51 is angled relative to the interface between the plates 34, 36. That is, each interior cavity 50, 51 includes a tapered width and angled surface which corresponds to the leaf spring 22 width and depth for a predetermined mounting segment 48 longitudinal location (FIG. 4).

The upper clamp plate 34 and the lower clamp plate 36 can only be assembled to the leaf spring at a single predefined longitudinal location within the mounting segment 48. That is, the interior cavities 50, 51 provide a shape equivalent to the leaf spring 22 at the predetermined location for interlocking the axle beam attachment system 30 with the leaf spring 22 at that predetermined location. As any longitudinal segment within the mounting segment 48 provides a singular cross-sectional shape, interior cavities 50, 51 defined for that shape will only properly fit at that predetermined location. The term "interlocking" as used herein defines the manner in which the axle beam attachment system will not slide along the leaf spring once assembled thereto due to the interface therebetween.

Figure 5:
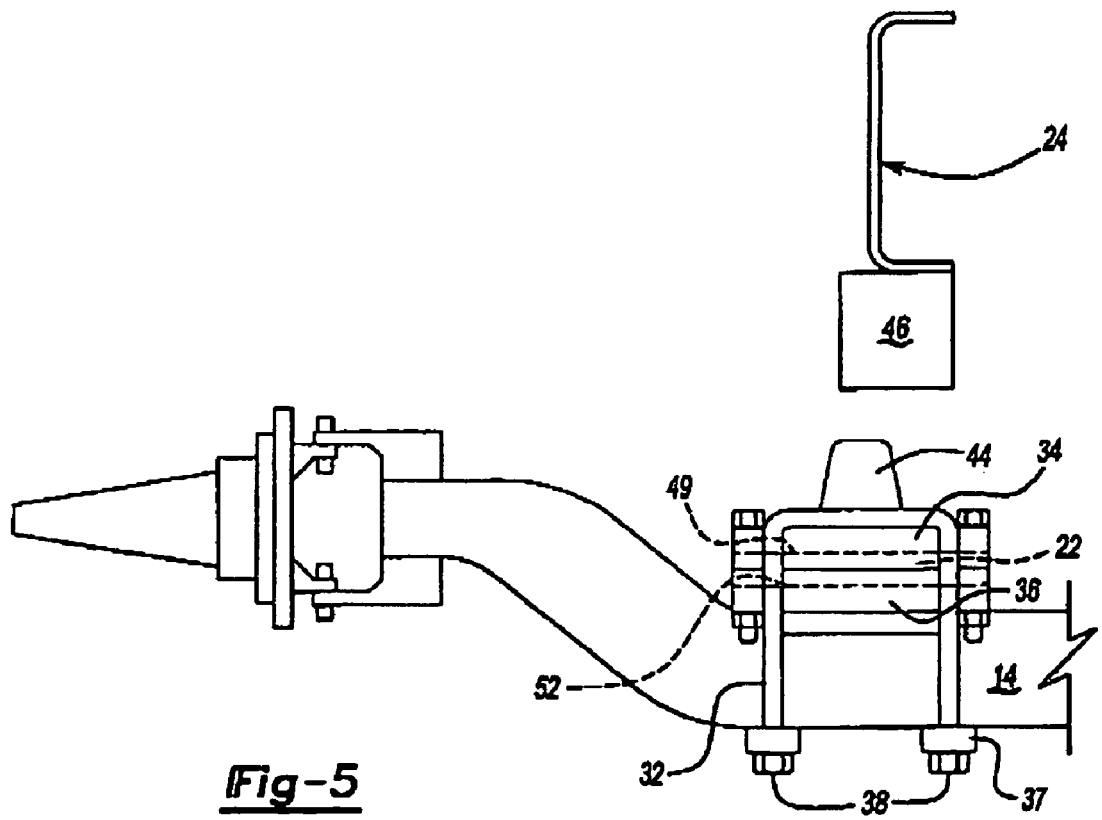
FIG. 5 is a front view of a composite leaf spring suspension system according to the present invention.

Preferably, the upper clamp plate 34 and the lower clamp plate 36 include matching apertures 54 for receipt of fasteners 57 such as bolts. The upper clamp plate 34 and the lower clamp plate 36 sandwich the leaf spring 22 within the interior cavity 50, 51. Once bolted together, the upper clamp plate 34 and the lower clamp plate 36 are interlocked onto the leaf spring 22 at the longitudinal position defined by the interior cavity 50, 51. That is, a leaf spring receipt cavity 52 (FIG. 5) defined by a combination of interior cavities 50, 51 is unique to the leaf spring segment at the desired the axle beam attachment system 30 position to provide an interlocking interface therebetween.

Figure 6:
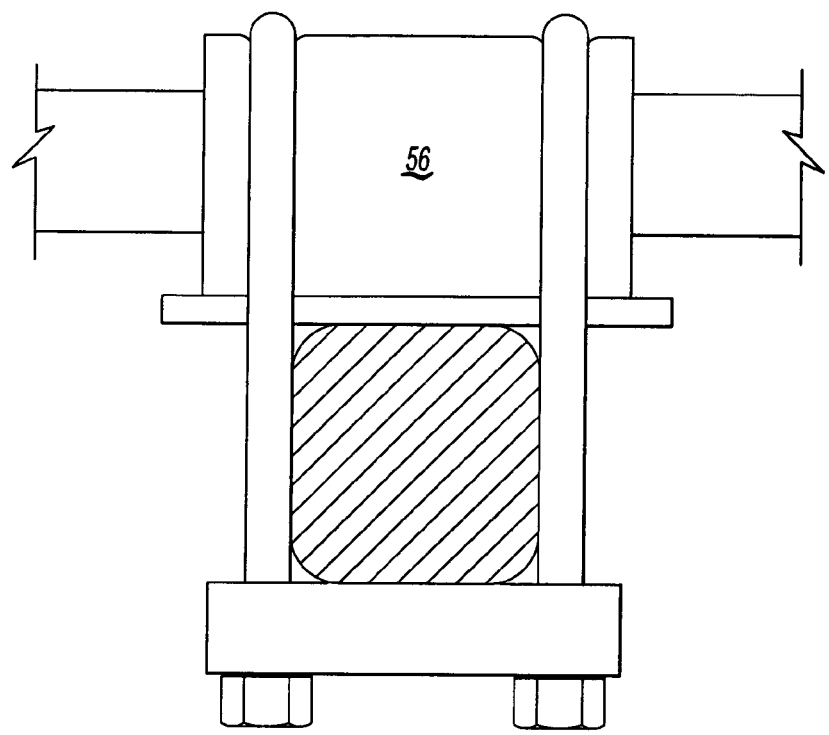
FIG. 6 is an expanded view of an axle beam attachment system.

The clamp plates 34, 36 may alternatively be overmolded upon the leaf spring 22 at the predefined axle beam attachment system 30 position. The individual clamp plates 34, 36 are thereby replaced by a single component 53 (FIG. 6) formed upon the leaf spring 22 through a molding process which overmolds a complimentary material directly to the leaf spring 22 at the desired position. Even if the overmolded material does not directly adhere to the leaf spring the unique cross-sectional shape of the leaf spring along the mounting segment 48 still achieves the interlocking interface.

Figure 7:
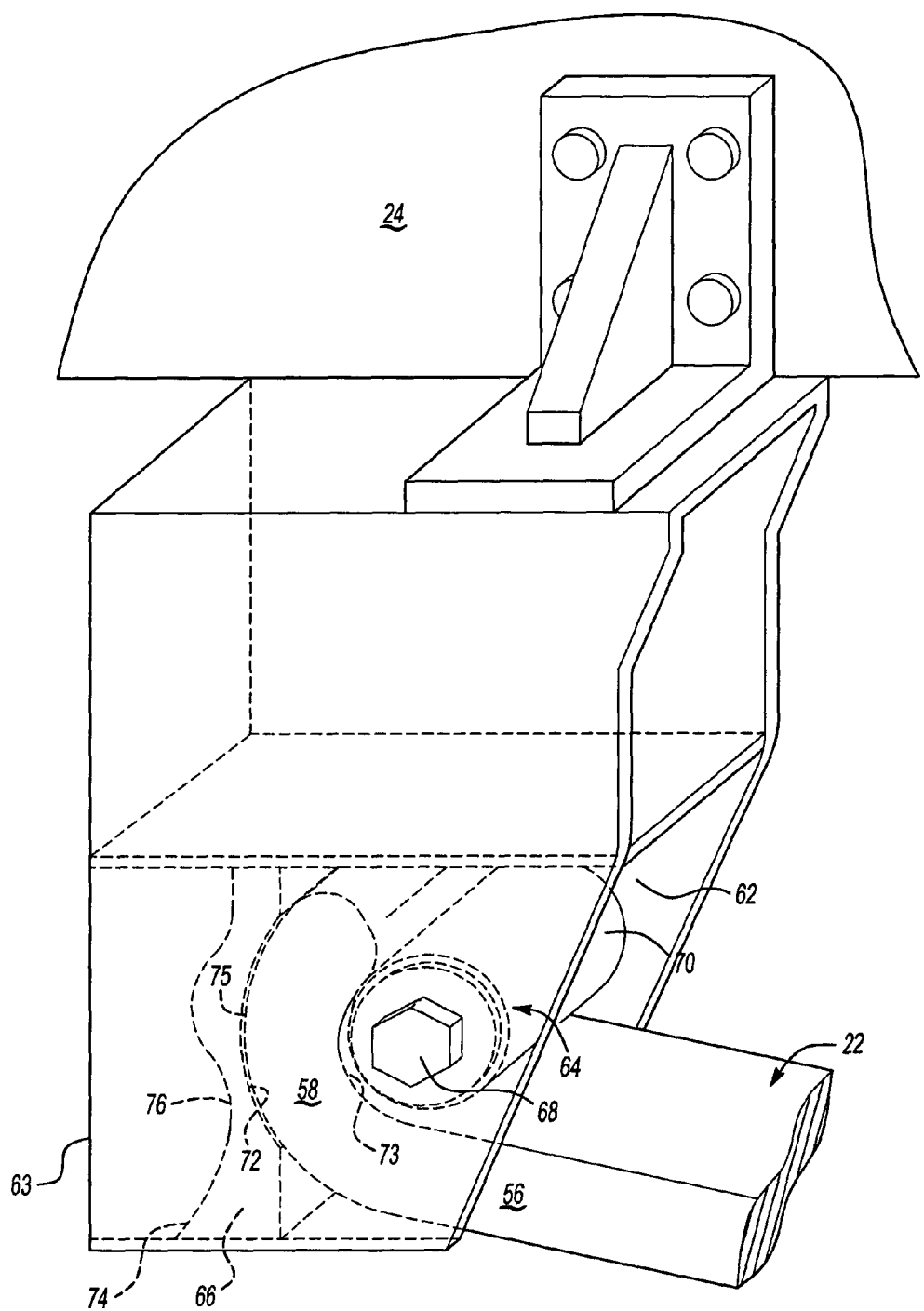
FIG. 7 is an expanded view of a front attachment system for use with a composite leaf spring.

Referring to FIG. 7, the front leaf spring attachment system 26 is illustrated. The forward leaf spring segment 56 of the leaf spring 22 preferably defines an arcuate segment 58. The forward leaf spring segment 56 is thinner in width than a rearward leaf spring segment 84 (also illustrated FIG. 3). The arcuate segment 58 is essentially a hook or bend of at least approximately ninety degrees to a main longitudinal segment 60 (FIG. 4) of the leaf spring 22. The forward segment is relatively thicker in depth due to the additional flexure stress at this attachment location.

The front leaf spring attachment system 26 includes a bracket 62 mounted to the longitudinal mainframes 24, a retaining pin 64 and a bumper 66. The bracket 62 is generally C-shaped (FIG. 1) such that the opening thereof receives the forward leaf spring segment 56 of the leaf spring 22. The bracket 62 is attached to the longitudinal mainframes 24 in any known manner such as through fasteners or welding.

The retaining pin 64 preferably includes a shank 68 surrounded by a resilient tube 70 such as rubber or the like. The shank 68 is preferably a bolt which threads through the bracket 62 across the opening thereof.

The bumper 66 is located adjacent a rear wall 63 of the bracket 62 opposite the retaining pin 64. The bumper includes an arcuate face 72 to engage the arcuate segment 58 and a serpentine face 74 opposite the arcuate face 72. The serpentine face 74 engages a complementary fixed serpentine surface 77 of the bracket 62 such that flexing of the leaf spring 22 will not displace the bumper 66. It should be understood that various bumper shapes will benefit from the present invention.

The arcuate segment 58 at least partially surrounds the retaining pin 64. Preferably, an inner radius portion 73 of the arcuate segment 58 engages the retaining pin 64 while an outer radius 75 of the arcuate segment 58 engages the bumper 66. The forward leaf spring segment 56 of the leaf spring 22 is thereby securely, yet resiliently, retained within the front leaf spring attachment system 28 without penetrating fasteners.

Figure 8:
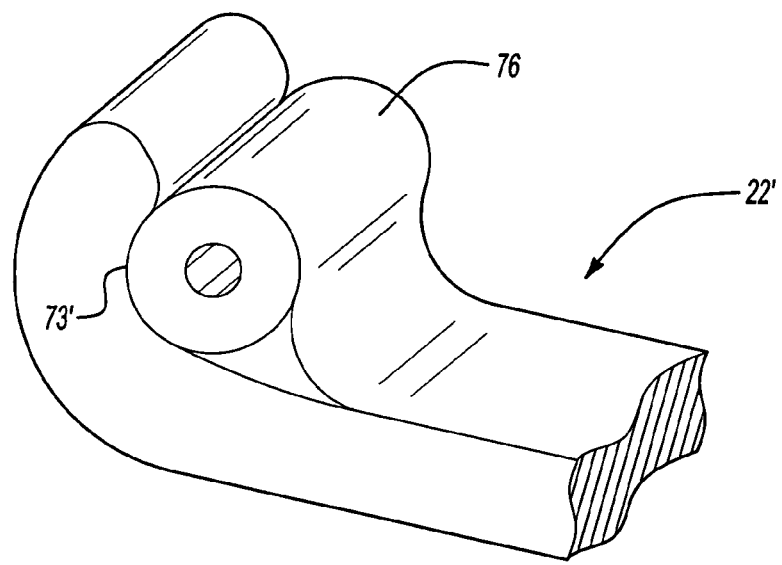
FIG. 8 is an expanded view of another integral front attachment system integral to a composite leaf spring designed according to the present invention.

Referring to FIG. 8, another leaf spring 22' is illustrated. A tubular member 76 manufactured of a resilient material is molded directly into the inner radius portion 73' of the leaf spring 22'. A molding process molds the tubular member 76 directly to the leaf spring 22' thereby simplifying the retaining pin to a single fastener, such as a bolt, which is passed through the tubular member 76 to mount the leaf spring 22'.

Figure 9:
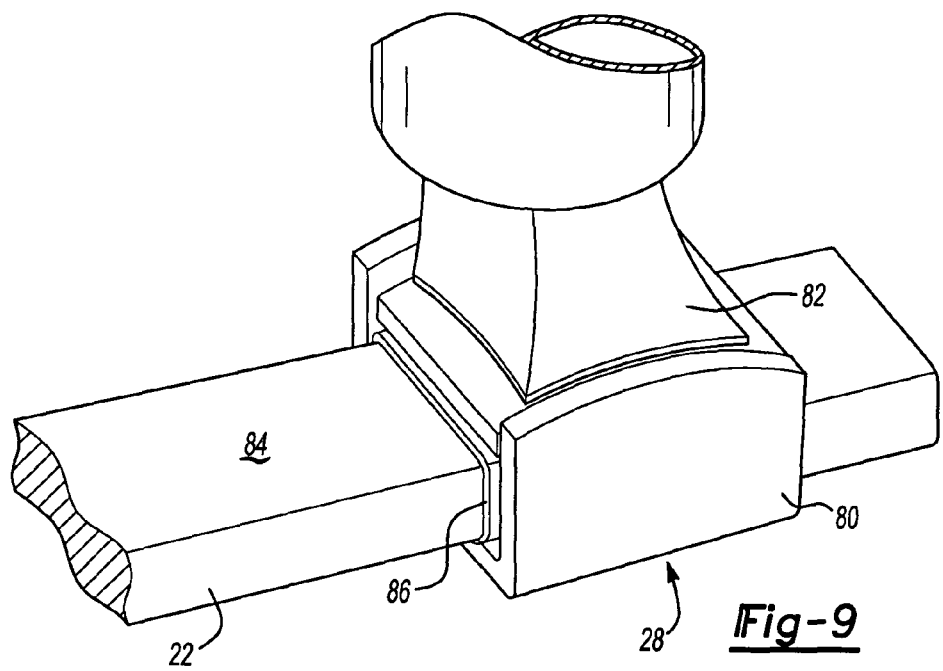
FIG. 9 is an expanded view of a rear attachment system for use with a composite leaf spring.

Referring to FIG. 9, the rear leaf spring attachment system 28 is illustrated. The rear leaf spring attachment system 28 includes a rear bracket 78, a mount 80 and a shear damper 82 mounted therebetween. The bracket 78 is attached to the longitudinal mainframes 24 in any known manner such as through fasteners or welding.

The mount 80 is preferably rectilinear in cross-section (FIG. 4) to receive the rearward leaf spring segment 84 of the leaf spring 22. The rearward leaf spring segment 84 preferably includes a substantially planar member of constant width. The mount 80 is preferably a rectangular tube to receive the substantially planar rearward leaf spring segment 84. The rearward leaf spring segment 84 is mounted within a resilient bumper 86 or the like such that direct contact between the leaf spring 22 and the mount 80 is avoided. During flexing of the leaf spring 22, the rearward leaf spring segment 84 of the leaf spring 22 slides within the mount 80 and resilient bumper 86.

The shear damper 82 further accommodates flexing of the leaf spring 22. As the leaf spring flexes, the shear damper 82 moves in shear in a direction substantially parallel to the longitudinal length of the leaf spring 22. That is, as the front leaf spring attachment system 26 effectively fixes longitudinal movement of the leaf spring 22, the rear leaf spring attachment system 28 needs to move in a longitudinal manner to accommodate the longitudinal lengthening of the leaf spring 22 as the leaf spring flexes toward a flatter arcuate geometry. The shear damper 82 in combination with sliding of the leaf spring 22 through the mount 80 accommodates this longitudinal lengthen during flexing.

Figure 10:
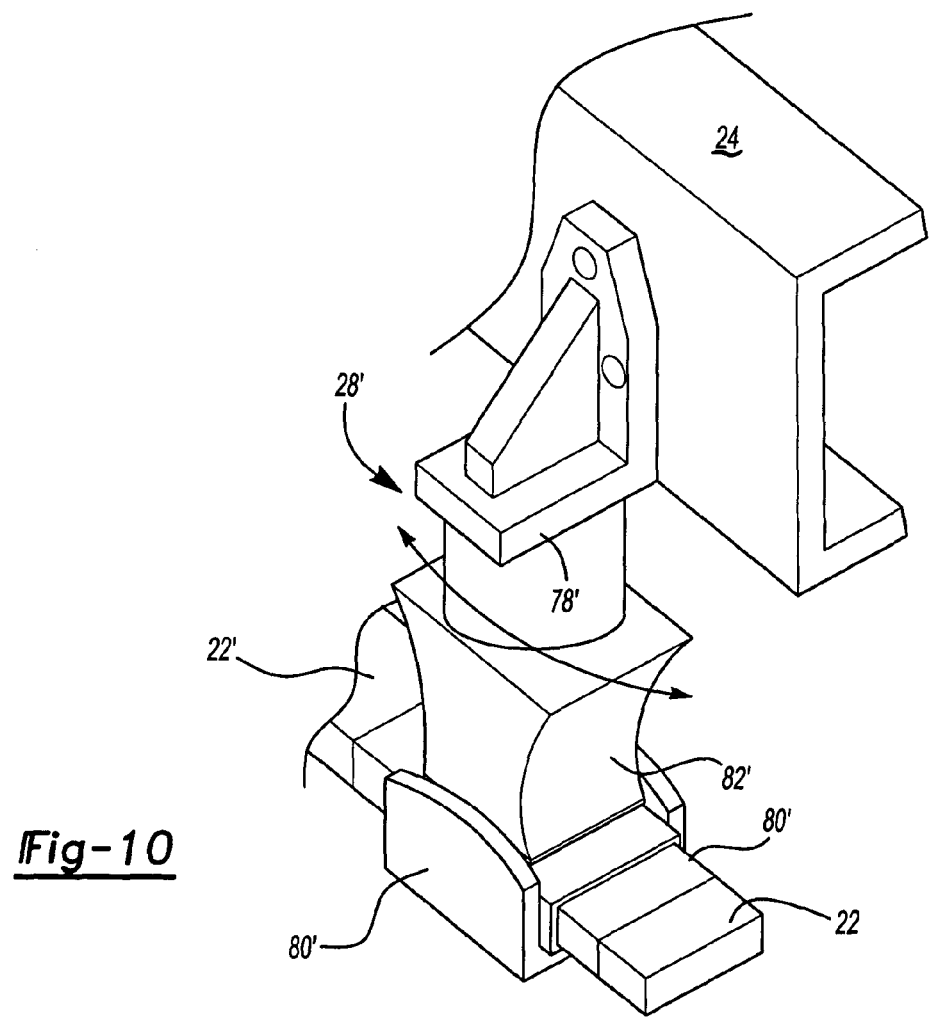
FIG. 10 is an expanded view of another rear attachment system integral to a composite leaf spring designed according to the present invention.

Referring to FIG. 10, another rear leaf spring attachment system 28' is illustrated.

The rear leaf spring attachment system 28' includes a rear bracket 78', a mount 80' and a shear damper 82' mounted therebetween. The mount 80' is formed integrally with the leaf spring 22' through a molding process which overmolds a complimentary material directly to the leaf spring 22' at the desired position.

The shear damper 82' alone accommodates the flexing of the leaf spring 22'. It should be further understood that the shear damper 82' may be included in the overmolding process such that a single integral rear leaf spring attachment system 28' is formed as part of the leaf spring 22'. The another rear leaf spring attachment system 28' need only be attached to the longitudinal mainframes 24 during assembly of the suspension system 10.

The rearward leaf spring segment 84 is relatively wide in comparison to comparative conventional steel leaf springs. Due to the width of the of the rearward leaf spring segment 84 the shear damper 82 may be successfully utilized alone to accommodate the flexing of the leaf spring 22. That is, the shear damper 82 can accommodate the flexing of the leaf spring 22 because the significant width of the leaf spring 22 provides a large mounting platform for a significantly large shear damper 82 heretofore unavailable with relatively thin conventional steel leaf springs.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A composite leaf spring comprising:
   a forward leaf spring segment comprising an arcuate segment extending therefrom,
   a rearward leaf spring segment, said forward leaf spring segment thicker in depth than said rearward leaf spring segment, said rearward leaf spring segment includes a substantially planar member of constant width and said forward leaf spring segment is thinner in width than said rearward leaf spring segment; and
   a mounting segment intermediate said forward leaf spring segment and said rearward leaf spring segment wherein said mounting segment includes a tapering width and an expanding depth such that any cross-section perpendicular to the mounting segment and within said mounting segment provides a singular cross-sectional shape.

2. The composite leaf spring as recited in claim 1, wherein said arcuate segment defines a bend of at least ninety degrees to said mounting segment.

3. The composite leaf spring as recited in claim 1, wherein any cross-section taken perpendicular to the mounting segment and within said mounting segment defines a substantially equivalent cross-sectional area.

4. The composite leaf spring as recited in claim 1, wherein said forward leaf spring segment, said mounting segment and said rearward leaf spring segment define a non-linear member.

5. The composite leaf spring as recited in claim 1, wherein said arcuate segment defines a hook.

6. A suspension system comprising:
   a composite leaf spring comprising a forward leaf spring segment defining an arcuate segment, a rearward leaf spring segment including a substantially planar member of constant width, and a mounting segment intermediate said forward leaf spring segment and said rearward leaf spring segment, said forward leaf spring segment is thinner in width and thicker in depth than said rearward leaf spring segment, said mounting segment includes a tapering width and an expanding depth such that any cross-section perpendicular to the mounting segment and within said mounting segment provides a singular cross-sectional shape; and
   a forward attachment system comprising a retaining pin transverse to said composite leaf spring and engaged with said arcuate segment.

7. The composite leaf spring as recited in claim 6, wherein said arcuate member defines a hook.

8. The composite leaf spring as recited in claim 6, wherein said arcuate member defines a bend of at least ninety degrees relative to said mounting segment.

9. The suspension system as recited in claim 6, wherein said retaining pin comprises a shank at least partially surrounded by a resilient tube.

10. The suspension system as recited in claim 6, wherein said retaining pin comprises a threaded fastener.

11. The suspension system as recited in claim 6, wherein said retaining pin engages an inner arc of said arcuate segment.

12. The suspension system as recited in claim 11, further comprising a bumper engaged with an outer arc of said arcuate segment to trap said arcuate segment therebetween.

13. The suspension system as recited in claim 12, wherein said bumper comprises an arcuate surface engaged with said outer arc of said arcuate segment.

14. The suspension system as recited in claim 13, wherein said bumper comprises a serpentine surface engaged to a complimentary fixed serpentine surface opposite said arcuate segment.

15. The suspension system as recited in claim 6, further comprising a tubular resilient member molded to said an inner arc of said arcuate segment.

16. The suspension system as recited in claim 6, further comprising a C-shaped bracket to retain said retaining pin.

17. A suspension system comprising:
   a composite leaf spring comprising a forward leaf spring segment defining an arcuate segment, a rearward leaf spring segment, and a mounting segment intermediate said forward leaf spring segment and said rearward leaf spring segment;
   a forward attachment system comprising a retaining pin transverse to said composite leaf spring and engaged with said arcuate segment, said retaining pin engaged with an inner arc of said arcuate segment; and
   a bumper engaged with an outer arc of said arcuate segment to trap said arcuate segment therebetween, said bumper includes an arcuate surface engaged with said outer arc of said arcuate segment and a serpentine surface engaged to a complimentary fixed serpentine surface opposite said arcuate segment.

18. A suspension system comprising:
   a composite leaf spring comprising a forward leaf spring segment defining an arcuate segment, a rearward leaf spring segment, and a mounting segment intermediate said forward leaf spring segment and said rearward leaf spring segment;
   a bracket defining an bracket opening to receive said arcuate segment;
   a retaining pin attached to said bracket transverse to said composite leaf spring and across said opening to engage an inner arc of said arcuate segment;
   a bumper retained within said bracket and engaged with an outer arc of said arcuate segment to trap said arcuate segment between said bumper and said retaining pin, said bumper including a serpentine surface engaged in a complimentary fixed serpentine surface of said bracket.

* * * * *

UNITED STATES PATENT AND TRADEMARK OFFICE
CERTIFICATE OF CORRECTION

PATENT NO. : 6,991,223 B2
DATED : January 31, 2006
INVENTOR(S) : Platner, David K., Rezakhanlou, Ramin and Trotter, James It is certified that error appears in the above-identified patent and that said Letters Patent is hereby corrected as shown below:

Column 8,
Line 9, delete "said".
Line 43, delete "in" and replace with -- to --.

Signed and Sealed this

Thirteenth Day of June, 2006

JON W. DUDAS
*Director of the United States Patent and Trademark Office*